(12) United States Patent
Wittlinger et al.

(10) Patent No.: US 10,882,354 B2
(45) Date of Patent: Jan. 5, 2021

(54) WHEEL HUB FOR HEAVY-DUTY VEHICLES

(71) Applicant: Hendrickson USA, L.L.C., Itasca, IL (US)

(72) Inventors: Jeffrey R. Wittlinger, Uniontown, OH (US); Phillippi R. Pierce, Canton, OH (US); Jeffrey S. Morris, Canton, OH (US); Jay D. White, Massillon, OH (US); Keith M. Ernenwein, North Canton, OH (US); Jason Andler, Canal Fulton, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 371 days.

(21) Appl. No.: 15/988,124

(22) Filed: May 24, 2018

(65) Prior Publication Data
US 2018/0339550 A1 Nov. 29, 2018

Related U.S. Application Data (60) Provisional application No. 62/510,812, filed on May 25, 2017.

(51) Int. Cl.
*B60B 27/02* (2006.01)
*B60B 27/00* (2006.01)
*B60B 7/04* (2006.01)

(52) U.S. Cl.
CPC .............. *B60B 27/02* (2013.01); *B60B 27/00* (2013.01); *B60B 7/04* (2013.01); *B60B 2310/202* (2013.01); *B60B 2310/208* (2013.01); *B60B 2310/2082* (2013.01); *B60B 2310/30* (2013.01); *F16C 2326/02* (2013.01)

(58) Field of Classification Search
CPC ..... B60B 27/00; B60B 27/005; B60B 27/001; B60B 27/0094; B60B 27/02; B60B 3/14; B60B 3/147; B60B 29/001
See application file for complete search history.

(56) References Cited

U.S. PATENT DOCUMENTS

| | | | |
|---|---|---|---|
| 1,895,499 A | 1/1933 | Stough | |
| 2,540,316 A * | 2/1951 | Ash | B60B 11/06 301/105.1 |
| 2,544,387 A * | 3/1951 | Kerr | B60B 3/12 301/65 |
| 2,622,934 A | 12/1952 | William | |
| 3,724,907 A * | 4/1973 | Housel | B60B 27/02 301/105.1 |

(Continued)

FOREIGN PATENT DOCUMENTS

| | | |
|---|---|---|
| DE | 597707 C | 6/1934 |
| DE | 20121339 U1 | 8/2002 |

(Continued)

*Primary Examiner* — Jason R Bellinger
(74) *Attorney, Agent, or Firm* — Dureska & Moore, LLC; David P. Dureska; Greg Strugalski (57) ABSTRACT

A wheel hub for a heavy-duty vehicle includes a first and second tubular hub segment. The first tubular hub segment has a first annular end surface. The second tubular hub segment has a second annular end surface and a radially extending flange. A continuous, circumferential joint is formed at the interface of the first annular end surface and second annular end surface.

21 Claims, 9 Drawing Sheets

(56) References Cited

U.S. PATENT DOCUMENTS

| | | | |
|---|---|---|---|
| 4,622,731 A * | 11/1986 | Kjell | B29C 45/006 |
| | | | 264/273 |
| 6,604,613 B2 | 8/2003 | Burgoon | |
| 6,604,794 B1 | 8/2003 | Messina | |
| 6,889,802 B2 * | 5/2005 | Hamperl | B60B 35/121 |
| | | | 188/17 |
| 7,134,732 B1 | 11/2006 | Spokane | |
| 7,281,769 B2 | 10/2007 | Pete | |
| 7,393,064 B2 | 7/2008 | Hall | |
| 7,419,226 B2 | 9/2008 | Jenkinson | |
| 8,287,052 B2 | 10/2012 | Fakhoury | |
| 8,534,770 B2 | 9/2013 | White | |
| 8,689,445 B2 | 4/2014 | White | |
| 8,950,556 B2 | 2/2015 | Root | |
| 9,506,515 B2 | 11/2016 | White | |
| 9,566,957 B2 | 2/2017 | Root | |
| 9,714,685 B2 | 7/2017 | Root | |
| 9,878,577 B2 | 1/2018 | Hester | |
| 9,897,154 B2 | 2/2018 | Root | |
| 10,359,073 B2 * | 7/2019 | Schlags | B60B 27/0005 |
| 2007/0052283 A1 | 3/2007 | White | |
| 2007/0052287 A1 | 3/2007 | White | |
| 2009/0245969 A1 | 10/2009 | White | |

FOREIGN PATENT DOCUMENTS

| | | |
|---|---|---|
| EP | 0521719 A1 | 1/1993 |
| JP | H110217706 A | 8/1998 |
| WO | 2010063299 A1 | 6/2010 |

* cited by examiner

WHEEL HUB FOR HEAVY-DUTY VEHICLES

CROSS-REFERENCE TO RELATED APPLICATION

This application claims the benefit of U.S. Provisional Patent Application Ser. No. 62/510,812 filed May 25, 2017.

TECHNICAL FIELD

The disclosed subject matter relates generally to vehicle axles and wheel end assemblies for heavy-duty vehicles. The disclosed subject matter is particularly directed to a wheel hub formed from two or more axially joined pieces.

BACKGROUND

The heavy-duty vehicle industry utilizes wheel end assemblies mounted on each end of one or more axles. Each wheel end assembly typically includes a wheel hub rotatably mounted on the end of the axle, commonly known as an axle spindle. Reference is made generally to a heavy-duty vehicle for the purpose of convenience, with the understanding that such reference includes trucks, tractor-trailers and semi-trailers, trailers, and the like.

The design and arrangement of the wheel hub and other components vary according to the specific vehicle requirements and anticipated uses. Moreover, the design and construction of prior art wheel hubs have limitations, disadvantages, and drawbacks in wheel hub manufacture, which typically lead to relatively heavy weight, relatively high cost of manufacture, and a limited choice of materials that limits physical properties of the wheel hub.

Prior art heavy-duty vehicle wheel hubs are typically made by casting a single mostly cylindrical shape from materials, such as ductile iron, aluminum, or an economically castable grade of steel. The single cast shape has critical surfaces machined to receive bearings, seals, and brake drum mounting studs. Most prior art wheel hubs are cast due to the strength that is required of the wheel hub and its relatively complex profile or configuration. Casting the wheel hub in a single piece is relatively expensive due to the typically large size of the casting. For example, when a one-piece wheel hub is cast, a casting core is employed to form an internal wheel hub cavity. The core must be precisely aligned within the casting mold due to the narrow tolerances that are required in the completed cast wheel hub. If the core shifts or is displaced during casting, the casting typically must be scrapped, thereby increasing the time and relative cost of forming one-piece cast wheel hubs. It is, therefore, desirable to reduce the cost of forming a wheel hub, reduce the weight of a wheel hub, and concurrently maintain or increase the physical properties of the wheel hub when compared to the prior art wheel hub.

The wheel hub casting must be machined to precise dimensions at critical surfaces for the bearings, seals, and brake drum mounting studs. Machining large numbers of precise dimensions on relatively large, one-piece castings of prior art wheel hubs is often difficult, which may increase the cost and time associated with the machining operation. As a result, it is desirable to reduce the difficulty associated with producing wheel hub castings and precision-machined critical surfaces.

Another limitation is the inability to achieve optimal physical properties. Because heavy-duty vehicle wheel hubs experience significant operational loads, strength and fatigue resistance are important properties. Wheel hubs readily cast from metals, such as ductile iron, aluminum, and certain grades of steel, often possess limited strength. Generally, in order to provide the wheel hub with fatigue resistance, the weight and/or cost of the wheel hub is often undesirably, but necessarily, increased. It is, therefore, desirable to develop a wheel hub structure employing materials that demonstrate good fatigue resistance and/or other optimal physical properties or attributes while optimizing the strength-to-weight ratio and reducing the cost of manufacturing.

Casting such large prior art one-piece wheel hubs also has disadvantages associated with possible gas porosity and shrink porosity. Gas porosity is the formation of bubbles within a casting. Shrink porosity is the formation of voids within a casting occurring while the molten cast metal is cooling. Porosity may compromise the strength, fatigue resistance, and/or service life of the prior art wheel hubs. As a result, it is desirable to reduce potential porosity issues associated with casting a large wheel hub.

In the prior art, an alternative to casting a heavy-duty vehicle wheel hub as a single piece that is subsequently machined has been to forge a wheel hub from aluminum or certain grades of steel. Forging has not been commonly employed for several reasons due to the limitations of the forging process for relatively large, complex shapes having a bulky profile, which undesirably increases the weight of the wheel hub. The forging of a component that is the size of a prior art heavy-duty vehicle wheel hub requires the use of very specialized and expensive forging presses that possess high tonnage force and a deep stroke that may not be readily available. As a result, it is undesirably expensive to form a large, forged, one-piece wheel hub.

These limitations, drawbacks, and disadvantages of prior art wheel hubs make it desirable to develop a wheel hub that is lighter in weight, more economical to manufacture, and exhibits equal or improved physical and performance properties when compared to prior art cast one-piece wheel hubs. The disclosed subject matter satisfies these needs and overcomes the limitations, drawbacks, and disadvantages of prior art wheel hubs.

SUMMARY

The wheel hub for heavy-duty vehicles of the disclosed subject matter reduces weight and cost of manufacturing while maintaining or increasing strength and fatigue resistance. The wheel hub for heavy-duty vehicles of the disclosed subject matter does not require casting or forging of large, complex, one-piece shapes, thereby eliminating the potential for porosity issues and the need for specialized and expensive equipment.

The wheel hub for heavy-duty vehicles of the disclosed subject matter generally includes first and second tubular hub segments. The first tubular hub segment has a first annular end surface. The second tubular hub segment has a second annular end surface and a radially extending flange. The wheel hub for heavy-duty vehicles also includes a continuous circumferential joint formed at an interface of the first annular end surface second annular end surface. At least one of the first and second tubular hub segments is forged.

The wheel hub for heavy-duty vehicles according to another aspect of the disclosed subject matter generally includes first, second, and third tubular hub segments. The first tubular hub segment has a first annular end surface. The second tubular hub segment has a second annular end surface and a third annular end surface. The third tubular hub segment has a fourth annular end surface and a flange. A first continuous circumferential joint is formed at an interface between the first and second annular end surfaces. A second continuous circumferential joint is formed at an interface between the third and fourth annual end surfaces. At least one of the first and second tubular hub segments is forged.

DRAWINGS

The following description and drawings set forth certain illustrative aspects and implementations of the disclosed subject matter. The drawings are indicative of but a few of the various ways in which one or more aspects or implementations may be employed. Further features of the disclosed subject matter will become apparent from reading the following description with reference to the accompanying drawings, in which.

Similar reference numerals refer to similar parts throughout the drawings.

DESCRIPTION

Exemplary details are set forth in order to provide an understanding of the disclosed subject matter. It will be understood, however, that the disclosed subject matter can be practiced without these specific details.

Figure 1:
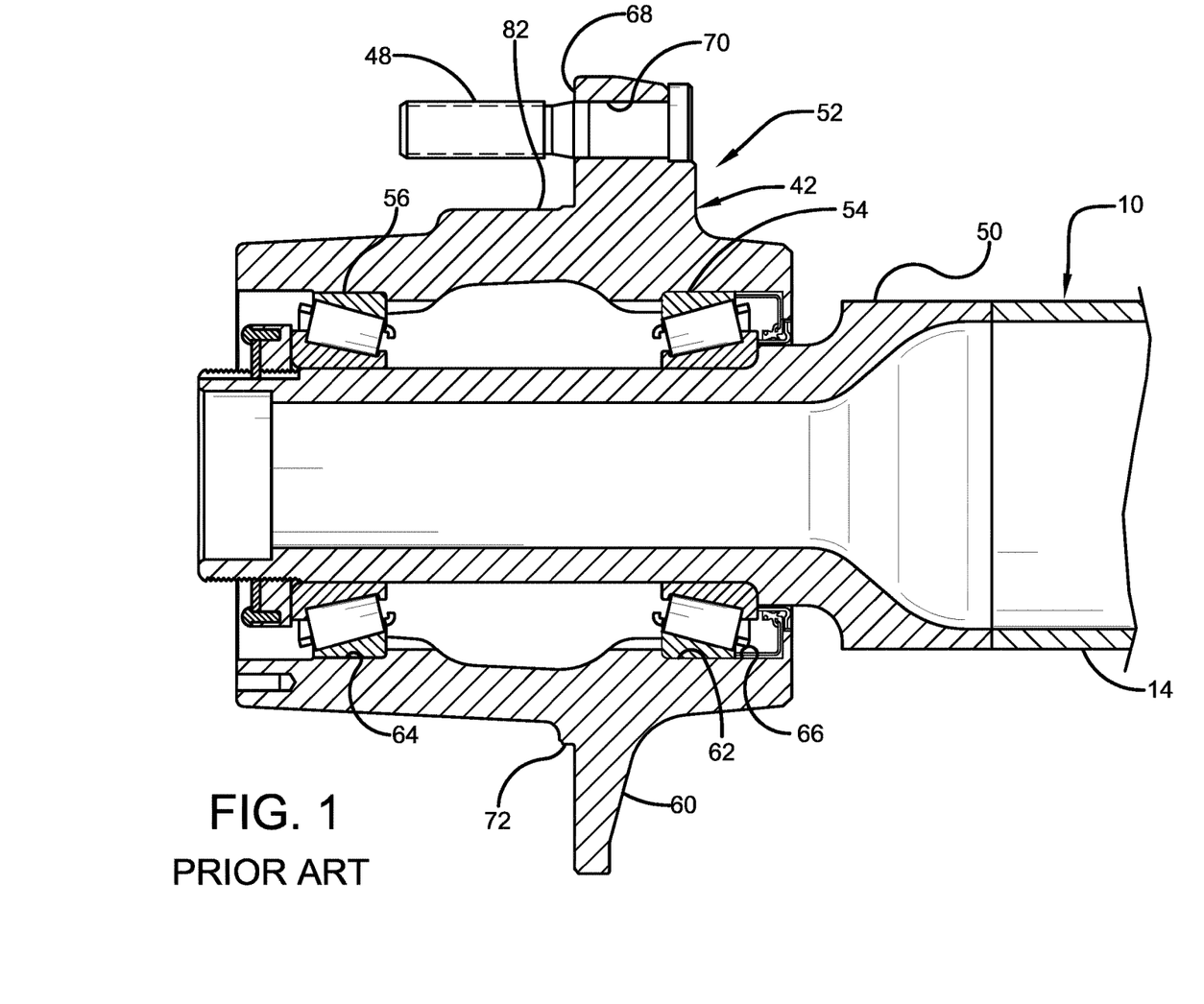
FIG. 1 is fragmentary cross-sectional view of a portion of a wheel end assembly for a heavy-duty vehicle including a prior art wheel hub.

In order to better understand the wheel hub for heavy-duty vehicles of the disclosed subject matter, a prior art wheel hub 42 for a heavy-duty vehicle is illustrated in FIG. 1 and mounted on an axle spindle of a wheel end assembly. A typical heavy-duty vehicle includes one or more axles 10. Each axle has a portion of a wheel end assembly 52 mounted to a respective end of an axle. Since each end of axle 10 and its associated portion of wheel end assembly 52 are generally identical, only one axle and wheel end assembly will be described. Axle 10 includes a central tube 14 with an axle spindle 50 attached by suitable means, such as welding, to the end of the central tube.

The prior art wheel hub 42 is rotatably mounted on axle spindle 10 by inboard and outboard bearings 54, 56, respectively, as is well known. Prior art wheel hub 42 is typically formed as a one-piece casting and includes a radially extending brake drum and wheel mounting flange 60. Critical surfaces on wheel hub 42 are machined to narrow tolerances and include an inboard bearing receiving bore 62, an outboard bearing receiving bore 64, a main seal bore 66, a brake drum and wheel rim mounting surface 68, wheel pilots 82, and openings 70 for wheel rim mounting studs 48. When drum brakes (not shown) are mounted onto wheel hub 42, machined brake drum pilots 72 enable the brake drum to be easily centered on the wheel hub for proper brake operation.

Axle spindle 50 and wheel end assembly 52 may be designed for a dual-wheel configuration in which two wheels (not shown) each mount a respective tire. The tire and wheel assemblies are mounted on the wheel hub 42. In a dual-wheel, standard-tire configuration, the focus of the load forces acting on axle spindle 50 during operation of the heavy-duty vehicle, typically referred to in the art as a load line, is contained in a plane that extends generally vertically through the axle spindle and between the two wheels.

Axle spindle 50 and wheel end assembly 52 may also accommodate a single wide tire (not shown) that replaces the dual-wheel configuration. The single wide tire may include a wheel that has a two-inch offset (not shown). This two inch offset places a vertical centerline of the wheel and, thus the load line, about two inches in an outboard direction. The load line is contained in a vertical plane further outboard than the load line associated with a dual-wheel configuration. This results in a relatively greater and undesirable moment arm being applied to the axle spindle 50.

The prior art wheel hub 42 includes a rapid section modulus change at an interface between wheel mounting flange 60 and drum pilot 72. This rapid section modulus change at the interface reduces strength and fatigue resistance of prior art wheel hub 42. Reduced strength and fatigue resistance and increased loading on prior art wheel hub 42 may reduce the service life and effectiveness of the wheel hub. Thus, there is a need for a wheel hub for a heavy-duty vehicle that has increased strength and fatigue resistance.

Prior art wheel hub 42 exhibits drawbacks, disadvantages, and limitations in its design and manufacture. Generally, wheel hub 42 is cast from durable and economical materials, such as ductile grey iron. Wheel hub 42 is then machined to provide precision surfaces. Casting such a large and complex one-piece component leads to undesirably high weight, high cost of manufacture, a limited selection of materials, and greater difficulty in machining the precise critical surfaces 62, 64, 66, 68, 70, 72, and 82. This results in limitations to the physical properties of the wheel hub. Such limitations, drawbacks, and disadvantages of prior art wheel hub 42 make it desirable to develop a wheel hub that has reduced weight, reduced manufacturing cost, and equivalent or improved physical properties. The disclosed subject matter satisfies these needs and overcomes the limitations, drawbacks, and disadvantages of prior art wheel hub 42.

A new and improved wheel hub 100 (FIGS. 2-3) for a heavy-duty vehicle according to an aspect of the disclosed subject matter is formed from two or more discrete pieces or components that are subsequently joined together. More particularly, wheel hub 100 includes an outboard portion 102 and an inboard portion 104 connected together at a joint 106. Outboard portion 102 is generally cylindrical and includes an outboard bearing receiving bore 108 that is machined to narrow tolerances and receives an outboard bearing assembly (not shown). Outboard portion 102 also includes an inboard end 122. Outboard portion 102 is separately formed from inboard portion 104 such that both outboard and inboard portion 102, 104 are relatively smaller and less complex than prior art wheel hub 42. The smaller and less complex shape of outboard and inboard portions 102, 104 facilitates relatively easier handling and machining as compared to prior art wheel hub 42. Specifically, due to the smaller size of outboard portion 102 and inboard portion 104, the outboard and inboard portions may be easily loaded and unloaded onto lathes or machining centers for rough pre-machining prior to being joined. Thus, relatively less final machining of the wheel hub 100 may be required.

Figure 3:
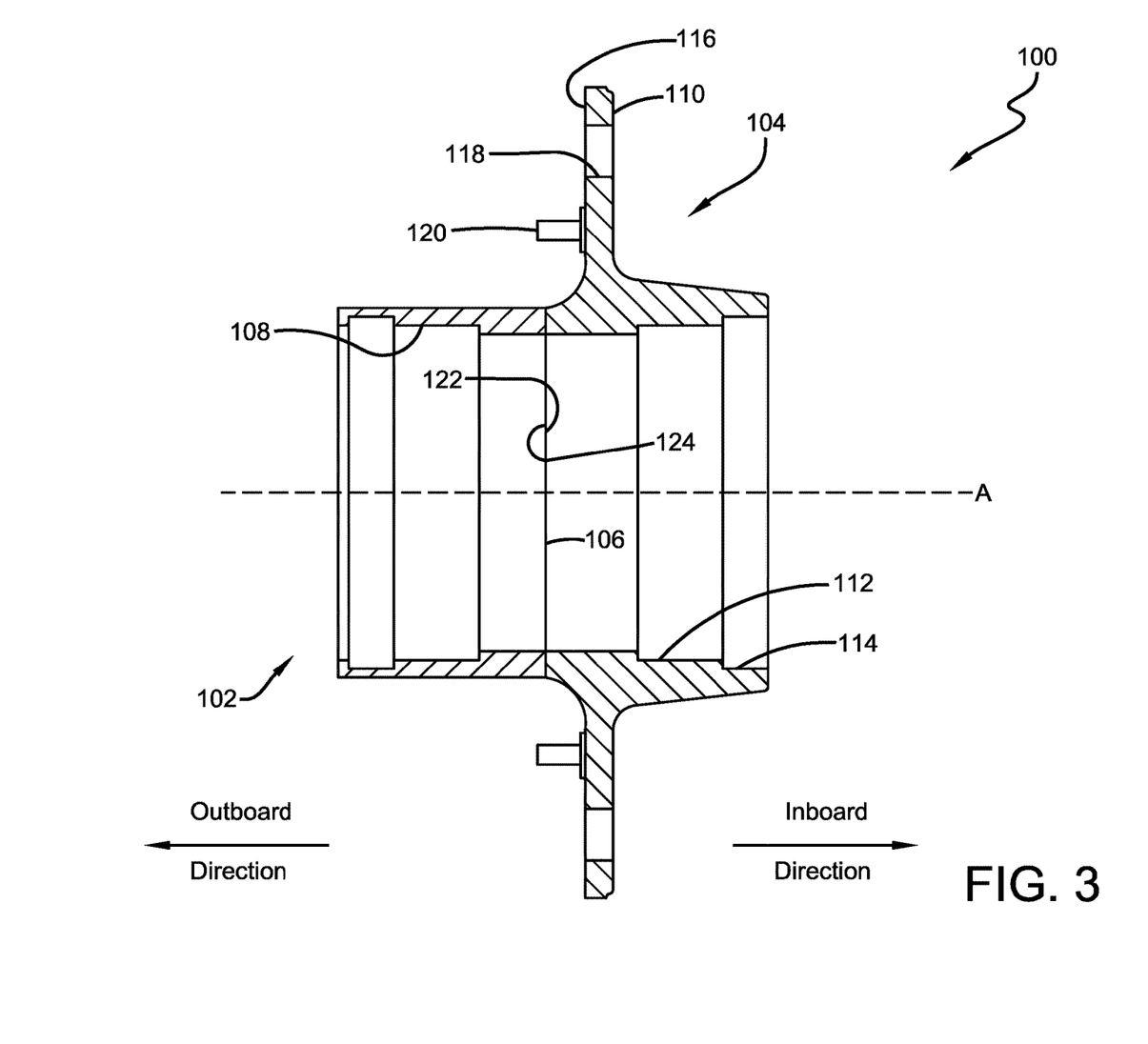
FIG. 3 is a cross-sectional view of the wheel hub for a heavy-duty vehicle shown in FIG. 2 taken approximately along line 3-3 in FIG. 2.

Inboard portion 104 is formed with a radially extending wheel mounting flange 110 and includes an inboard bearing receiving bore 112. Inboard bearing receiving bore 112 is machined to narrow tolerances for receiving an inboard bearing assembly (not shown). Inboard portion 104 also includes an outboard end 124 and a main seal bore 114 (FIG. 3). The wheel mounting flange 110 includes a brake drum and wheel rim mounting surface 116 and openings 118, which receive brake drum and wheel rim mounting studs (not shown). The wheel mounting flange 110 extends radially outward from inboard portion 104. The wheel mounting flange 110 includes optional pilot studs 120 rigidly attached to the wheel mounting flange. Each of the pilot studs 120 may include a shoulder for proper positioning and alignment of a brake drum (not shown) and a wheel rim (not shown) on wheel hub 100 in compliance with Society for Automotive Engineers (SAE) recommended practices J694 and J1671. Forming inboard portion 104 separately from outboard portion 102 facilitates relatively easier handling and machining as compared to prior art wheel hub 42.

Figure 2:
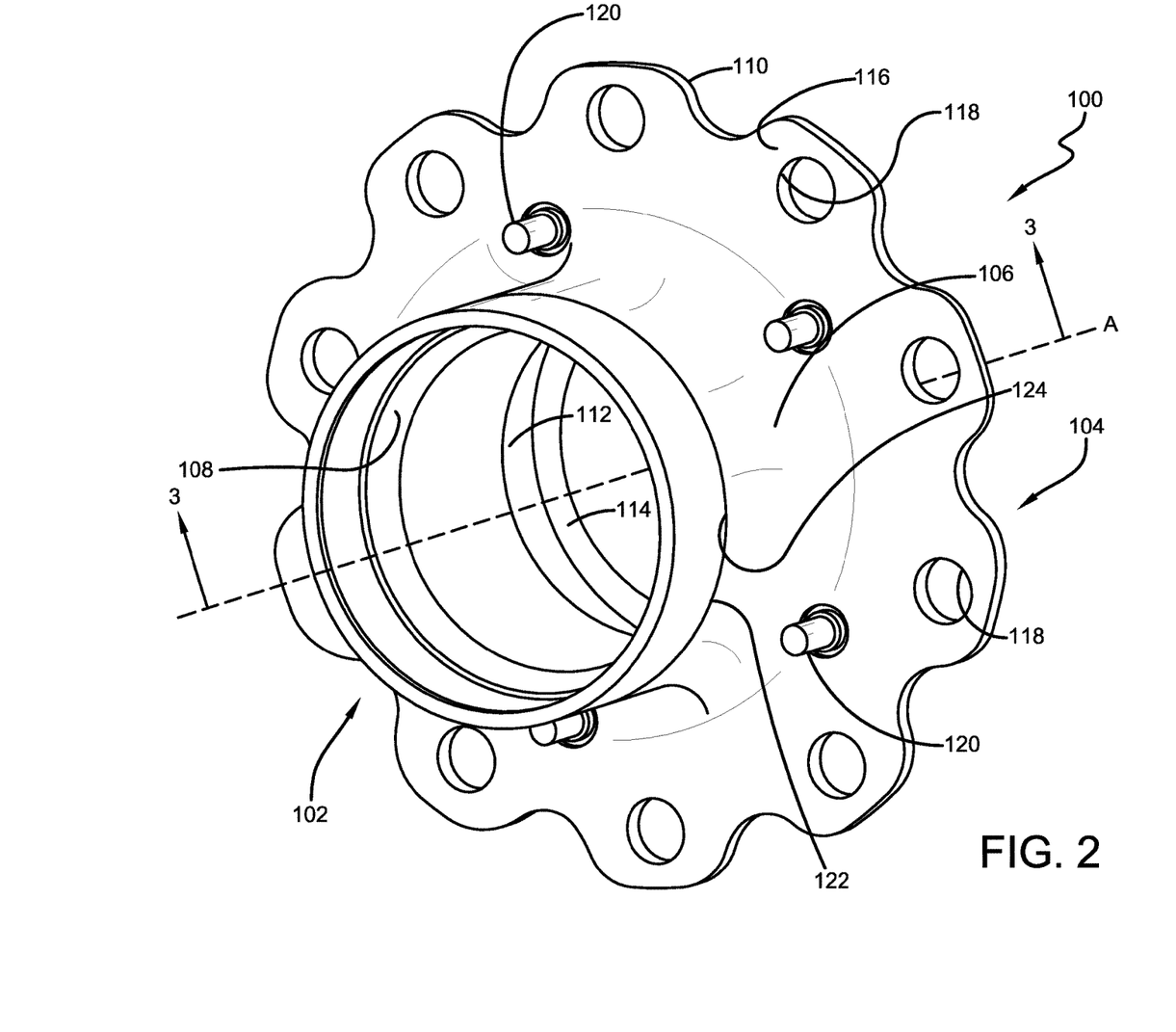
FIG. 2 is a perspective view of a two-piece wheel hub according to an aspect of the disclosed subject matter for a heavy-duty vehicle viewed from an outboard side.

Joint 106 is located between outboard bearing receiving bore 108 of outboard portion 102 and inboard bearing receiving bore 112 of inboard portion 104 in an area that exhibits relatively low stress in wheel hub 100. Placement of joint 106 in a relatively low stress area decreases the potential for fatigue issues to occur. Inboard end 122 of outboard hub portion 102 and outboard end 124 of inboard hub portion 104 are joined at joint 106 in a manner known in the art. For example, joint 106 may be formed between inboard end 122 and outboard end 124 by friction or laser welding.

Inboard end 122 of outboard hub portion 102 and outboard end 124 of inboard hub portion 104 may be formed as flat annular surfaces, contained in a plane substantially perpendicular to a longitudinal central axis A. The inboard and outboard ends 122, 124 can be arranged to abut one another to enable forming a butt joint for rotational friction welding. Thus, forming joint 106 may involve abutting inboard and outboard ends 122, 124 against one another and rotating them about longitudinal central axis A. This welding process results in a good quality connection between outboard and inboard portions 102, 104. The weldment formed at joint 106 is preferably machined by techniques known in the art in order to remove excess or displaced material, such as curled metal, or flash curl, from the inner and outer surfaces of the joint. This machining reduces stress risers in the wheel hub 100 adjacent the joint 106. Laser welding may also be used to form joint 106 in order to minimize the amount of excess material generated and reduce the amount of machining required.

Alternatively, inboard and outboard ends 122, 124 may be formed with similarly-shaped and cooperating non-planar surfaces (not shown), enabling outboard and inboard portions 102, 104 to mechanically engage one another at joint 106 prior to welding. This may enable joint 106 to be formed by linear friction welding. Specifically, the non-planar surfaces formed on inboard and outboard ends 122, 124 may include interfering tolerances and geometry that enable linear friction welding. Linear reversing displacement parallel to the longitudinal central axis A of outboard portion 102 and inboard portion 104 causes the interfering tolerances or geometry to fuse the outboard and inboard portions to form joint 106. Linear friction welding may be appropriate when materials used to form outboard portion 102 and/or inboard portion 104 are sensitive to fatigue. The mechanically cooperating, non-planar surfaces formed on inboard and outboard ends 122, 124 may counteract and/or relieve stress in joint 106. A secondary process may then be required to seal joint 106 as is known. Such secondary process may be performed before or after machining of critical surfaces on wheel hub 100.

It is also contemplated that outboard portion 102 and inboard portion 104 may be connected at joint 106 by other techniques, such as metal inert gas (MIG) welding, other types of welding, or adhesive bonding, as is known. Wheel hub 100 may also be tempered or heat treated after the welding or joining operation to decrease potential detrimental welding effects at joint 106.

Outboard portion 102 and inboard portion 104 may be formed by casting or forging. Specifically, both outboard portion 102 and inboard portion 104 include a profile that is relatively smaller, less complex, and has some relatively thinner components than prior art wheel hub 42. As a result, outboard portion 102 and inboard portion 104 are more economical and easier to form. Casting the smaller and less complex shape of outboard portion 102 and inboard portion 104 may result in fewer issues with porosity compared to larger, more complex profiles. Casting or forging of smaller, less complex shapes may be better controlled than that of larger, more complex shapes, such as prior art wheel hub 42, and may reduce the amount of machining required to form precise critical surfaces. Forging the smaller and less complex shapes of outboard and inboard portions 102, 104 may require machines with less stroke depth and tonnage application than necessary to make prior art hub 42. This results in more efficient machining to narrower tolerances on separately-formed outboard and inboard portions 102, 104.

Casting or forging wheel hub 100 as two or more discrete portions optimizes the amount of material employed to form the wheel hub. Specifically, outboard portion 102 and inboard portion 104 are smaller and less complex, which may result in reduced amount of scrap from the forming process. Specifically, relatively large, one-piece prior art wheel hub 42 is cast with a core requiring precise alignment within the casting. If the core shifts or is displaced, the wheel hub 42 must be scrapped. However, outboard and inboard portions 102, 104 of wheel hub 100 may not need to employ a core for casting, which reduces potential scrap and decreases cost.

Traditional casting also limits the materials that can be used to form prior art wheel hub 42. Castable materials typically include aluminum or a ferrous material, such as iron or an economically castable grade of steel. Outboard portion 102 and inboard portion 104 are relatively smaller and less complex than prior art wheel hub 42. As a result, outboard and inboard portions 102, 104 may be formed by processes other than casting. Outboard portion 102 and inboard portion 104 may both be cast or formed from another process, such as forging or roll forming. Alternatively, each of the outboard and inboard portions 102, 104, respectively, may be formed by different and distinct processes.

Forging outboard portion 102 and/or inboard portion 104 reduces the cost of wheel hub 100. Forging large, complex parts, such as prior art wheel hub 42, would require the use of specialized and expensive forging presses with both relatively high tonnage application and deep stroke. This is a difficult and expensive combination to achieve in a forging press. Outboard portion 102 and inboard portion 104 are smaller and less complex such that high tonnage and deep stroke forging presses are unnecessary. Many standard forging presses may be used to forge outboard and inboard portions 102, 104, which reduces difficulty and cost required to forge components used to make wheel hub 100.

Different materials may be used to form non-cast portions of outboard and inboard portions 102, 104. Specifically, it is desirable to optimize the strength-to-weight ratio of wheel hub 100 to provide a relatively lighter wheel hub with sufficient strength to withstand loads and forces during operation of the heavy-duty vehicle. Optimization of strength-to-weight ratio typically requires the use of materials considered non-economical or not readily castable, such as high-strength steel. However, one or both of outboard portion 102 and inboard portion 104 may be formed by processes other than casting, which allows the forging of grades of steel that possess enough carbon content to maintain high fatigue resistance in areas of the wheel hub 100 susceptible to fatigue. Such grades of steel may include 1038 carbon steel, 1038 modified carbon steel with increased manganese content, 1025 through 1030 carbon steel, and 1020 carbon steel.

In addition, outboard portion 102 and inboard portion 104 may be optimized for specific properties. The inboard portion 104 includes wheel mounting flange 110, which experiences particularly high stresses due to the attachment of the brake drum (not shown) and the wheel rim (not shown). The inboard portion 104 may be forged from high-strength steel followed by heat treatment, tempering, and/or hardening, such as induction hardening, to provide the specific desired properties. Outboard portion 102 may experience less stress than inboard portion 104, and, as such, may be formed by casting before being welded to the inboard portion at joint 106. It will be apparent that outbound portion 102 may be forged in particular instances. This enables wheel hub 100 to balance different properties or attributes and decrease the cost of production.

Pilot studs 120 employed may be employed with wheel hub 100 to provide relatively increased corrosion resistance. Specifically, heavy-duty vehicles travel over roads with moisture on the road surface that may generate road spray. Road spray is known to include salt and/or other chemicals present on the road surface. This may include certain chemicals for anti-icing. Such salt and/or anti-icing chemicals can cause corrosion cells to form and propagate at interfaces where it collects. Road spray may be forced upward by the vehicle tires from the road surface and toward the underside of the heavy-duty vehicle. Road spray may also contact exposed components on the underside of the heavy-duty vehicle. In prior art wheel hub 42, road spray may collect in an interface between the wheel hub drum pilot surfaces and a brake drum, and an interface between the wheel hub wheel pilot surface 82 (FIG. 1) and a wheel rim. The propagation of corrosion at such interfaces may impede proper piloting and alignment of the brake drum and/or the wheel rim on prior art wheel hub 42, causing reduced service life and/or performance of the wheel hub and adjacent components.

Pilot studs 120 of wheel hub 100 provide a reduced contact area between the brake drum and the wheel hub surface at the drum pilots and between the wheel rim and the wheel hub surface at the wheel pilots. Specifically, the pilot studs 120 have substantially only point contacts with the brake drum and wheel rim at each pilot stud. This decreased amount of contact area between the pilot studs 120 and the brake drum and wheel rim minimizes formation of corrosion cells. Pilot studs 120 can be separately hardened or coated for additional corrosion resistance. Proper piloting and alignment of adjacent components with wheel hub 100 provides improved service life and performance of the wheel hub.

A wheel hub 130 (FIGS. 4-5) for a heavy-duty vehicle, according to another aspect of the disclosed subject matter, is illustrated. Wheel hub 130 is similar in construction and function to wheel hub 100 (FIG. 2). Wheel hub 130 includes two or more discrete pieces or components, such as an outboard portion 132 and an inboard portion 134 that are axially joined together at a joint 136. Outboard portion 132 includes an inboard end 133 and outboard bearing receiving bore 138, which is machined to narrow tolerances and receives an outboard bearing (not shown). Inboard portion 134 includes an outboard end 135, a radially-extending mounting flange 140, a main seal bore 143, and an inboard bearing receiving bore 142 that receives an inboard bearing (not shown). The main seal bore 143 and inboard bearing receiving bore 142 are machined to narrow tolerances. Inboard portion 134 also includes a brake drum and wheel rim mounting surface 144 and openings 145 that receive brake drum and wheel rim mounting studs (not shown).

Figure 4:
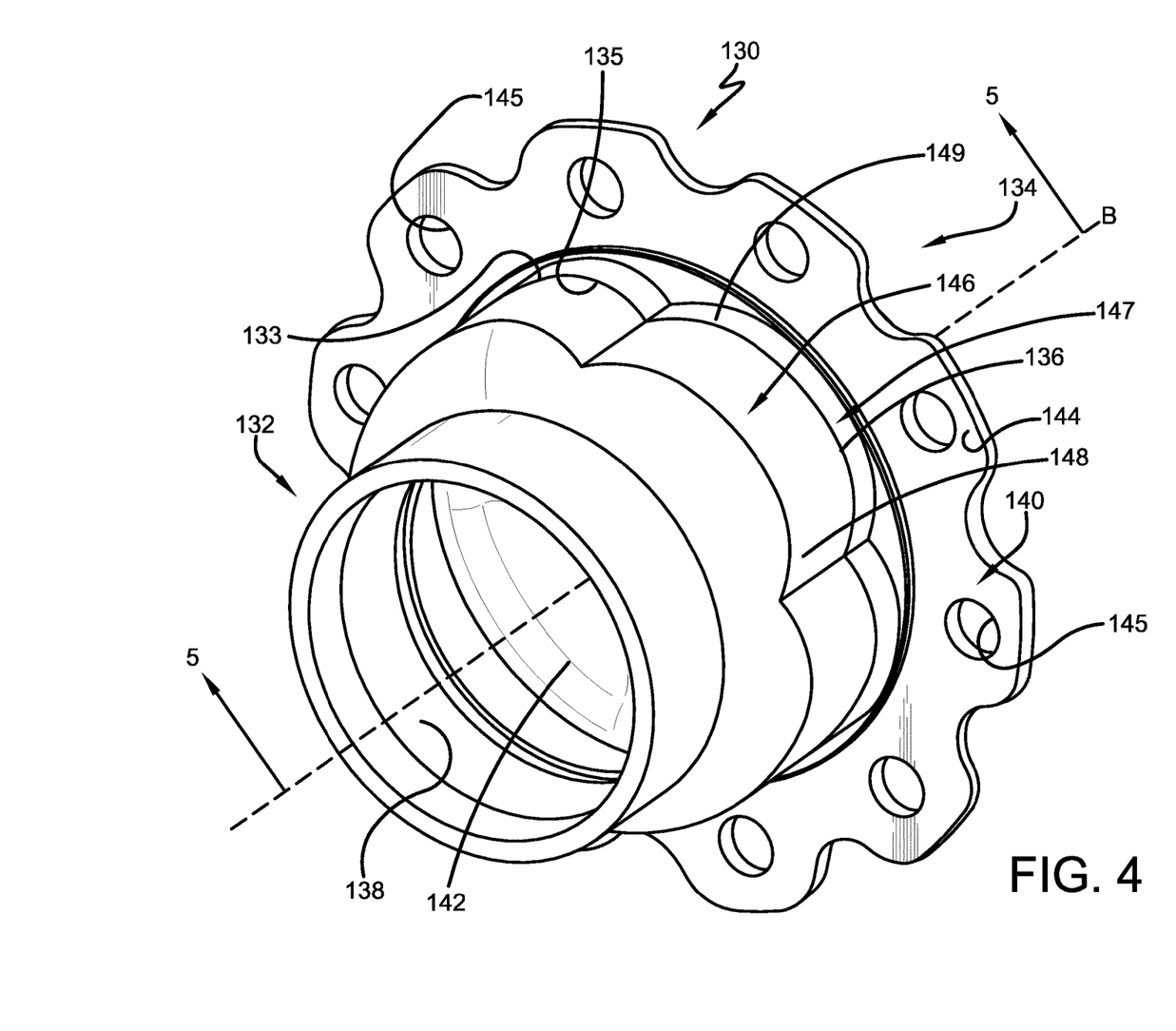
FIG. 4 is a perspective view of a wheel hub according to another aspect of the disclosed subject matter for a heavy-duty vehicle viewed from an outboard side.
Figure 5:
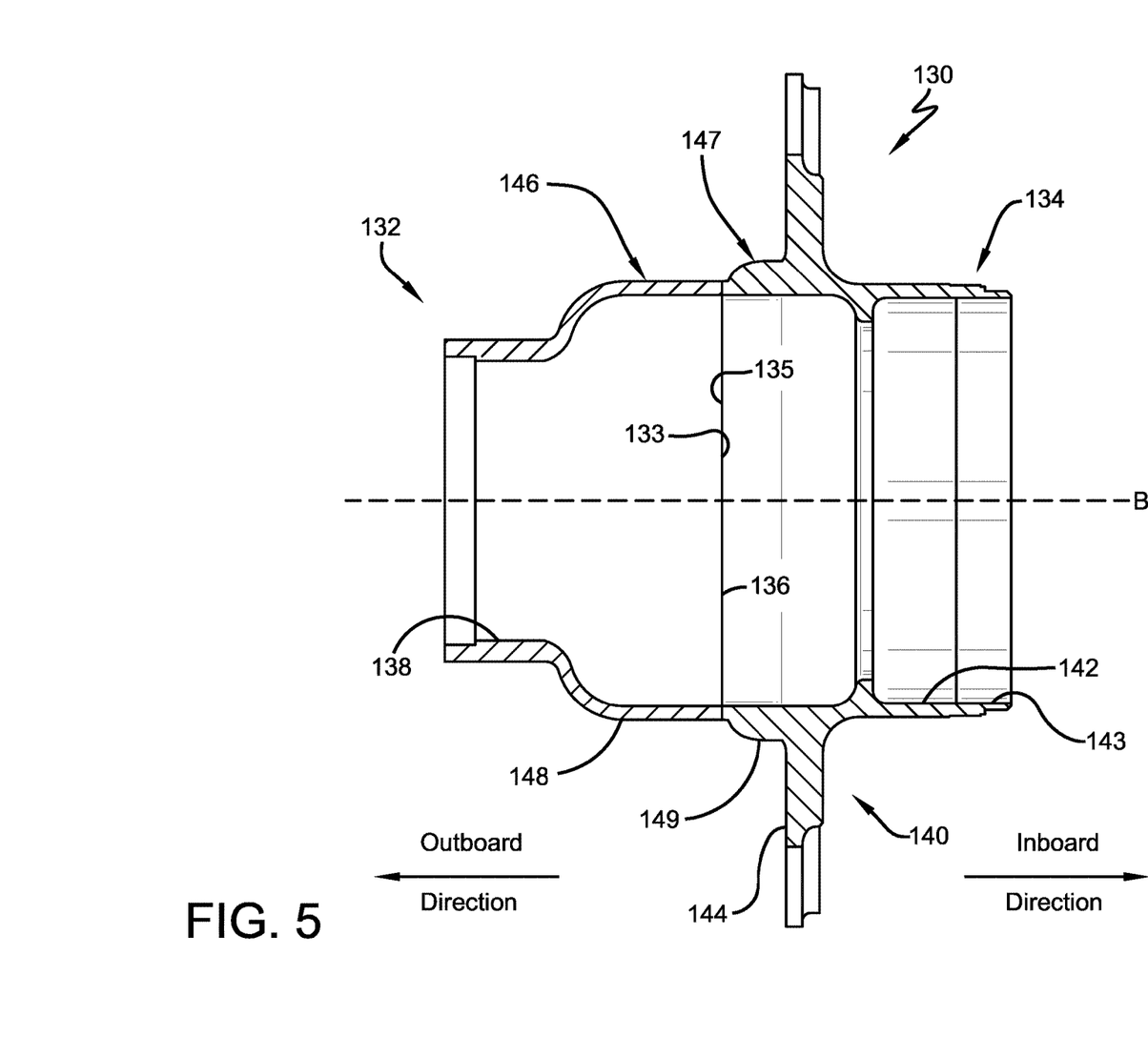
FIG. 5 is a cross-sectional view of the wheel hub shown in FIG. 4 taken approximately along line 5-5 in FIG. 4.

Inboard and outboard ends 133, 135 may be planar annular surfaces, contained in a plane substantially perpendicular to a longitudinal central axis B of wheel hub 130. Inboard and outboard ends 133, 135 may be arranged to abut one another to enable forming a butt joint for rotational friction welding. Thus, forming joint 136 may involve abutting inboard and outboard ends 133, 135 against one another and rotating them about respective rotational axes. Joint 136 of wheel hub 130 is located between outboard bearing receiving bore 138 of outboard portion 132 and inboard bearing receiving bore 142 of inboard portion 134 in an area that experiences relatively low stress in the wheel hub.

Wheel hub 130 includes wheel pilots 146 and drum pilots 147 in place of pilot studs 120 of wheel hub 100. Wheel pilots 146 have narrow tolerance surface areas formed on a radially outer surface 148 of outboard portion 132, and are circumferentially spaced about the perimeter of wheel hub 130. Wheel pilots 146 serve as indices for proper positioning of a wheel rim (not shown) about the wheel hub 130. Drum pilots 147 have narrow tolerance surface areas formed on a radially outer surface 149 of inboard portion 134. Drum pilots 147 may be axially aligned with wheel pilots 146 and spaced about the perimeter of wheel hub 130 as illustrated in FIG. 4. Drum pilots 147 serve as guides for proper positioning of the brake drum (not shown) about the wheel hub 130.

Wheel pilots 146 and drum pilots 147 may be formed as cylindrical or frustoconical segments of the outboard and inboard portions 132, 134, respectively. Reliefs may then be made in wheel pilots 146 and drum pilots 147 by swaging or any other suitable process after outboard portion 132 and inboard portion 134 have been joined together. The reliefs reduce the size of and the contact area between the wheel pilots 146 and drum pilots 147 and the wheel rim and brake drum, respectively. As a result, the wheel pilots 146 and drum pilots 147 are less likely to corrode. This corrosion resistance makes removal of the wheel rim and brake drum relatively easier. Alternatively, wheel pilots 146 and drum pilots 147 may be formed as something other than cylindrical or frustoconical segments of the inboard and outboard hub portions 134, 132 respectively. The wheel pilots 146 and drum pilots 147 may then be aligned and then joined by laser welding, induction butt welding, or any other suitable process. It will also be apparent that wheel pilots 146 and drum pilots 147 may be formed as segments of the inboard portion 134 only, such that joint 136 may be formed and located outboard of the wheel pilots.

Outboard and inboard portions 132, 134, respectively, may be easily formed by forging, casting, or other processes to incorporate wheel pilots 146 and drum pilots 147. Outboard portion 132 and inboard portion 134 may be joined at joint 136 by friction welding, laser welding, or other suitable joining processes described above or known in the art. Thus, wheel hub 130 utilizes forming processes and materials that allow for reduced weight, lower cost, and improved physical properties.

Wheel hub 130 also exhibits increased corrosion resistance. Specifically, wheel hub 130 includes separate outboard portion 132 and inboard portion 134 that may be locally hardened or treated for corrosion resistance in an economical manner. This enables wheel hub 130 to inhibit corrosion and allow proper piloting and alignment of the brake drum and the wheel rim with wheel hub 130, improving the service life and performance of the wheel hub.

A wheel hub 150 (FIGS. 6-8) for a heavy-duty vehicle, according to yet another aspect of the disclosed subject matter, is similar in construction and arrangement to wheel hub 100 (FIGS. 2-3) and wheel hub 130 (FIGS. 4-5) and is formed from two or more discrete portions, including an outboard portion 152 and an inboard portion 154, connected together at a joint 156. Outboard portion 152 includes an inboard end 180 (FIG. 8), a barrel 174, one or more bosses 186 (FIG. 6), an outboard bearing cup engaging end surface 175, and an outboard bearing receiving bore 158. Outboard bearing receiving bore 158 is machined to a narrow tolerance and receives an outboard bearing (not shown). Bosses 186 may be integrally formed or attached to outer portion 152. Bosses 186 generally include openings 188 for receiving fasteners (not shown) to attach a wheel hub cap (not shown).

Inboard portion 154 is formed with a barrel 176 and a radially extending wheel mounting flange 160. Barrel 176 includes an inboard bearing receiving bore 162 machined to narrow tolerances that receives an inboard bearing (not shown). Inboard portion 154 also includes an outboard end 182 (FIG. 8), an inboard bearing cup engaging end surface 177, a main seal bore 164, a drum and wheel rim mounting surface 166, and openings 168 that receive mounting studs 169. Each of the outboard end 182, main seal bore 164, drum and wheel rim mounting surface 166, and openings 168 are machined to narrow tolerances. Wheel mounting flange 160 is formed with openings 170 for receiving removable pilot studs 172. A portion of each of the pilot studs 172 extends through its respective opening 170 and projects from the inboard side. As a result, each of the pilot studs 172 may be removed in an outboard direction by applying pressure to the inboard projection. The pilot studs 172 are also formed with a shoulder 173 that abuts the drum and wheel rim mounting surface 166. This allows proper piloting of the brake drum (not shown) and the wheel rim (not shown). As a result, the pilot studs 172 conform to SAE recommended practices J694 and J1671.

A reservoir or channel 178 (FIG. 8) is formed in the inboard portion 154. A majority of the volume of the reservoir channel 178 is located in a region substantially radially inward of the wheel mounting flange 160. The reservoir channel 178 may have a portion with an inner diameter that is greater than an outer diameter of barrels 174, 176. The reservoir channel 178 provides a volume for additional lubricant to occupy and further lessens the weight of the hub 150 by displacing metal material. Locating the reservoir channel 178 relatively close to the inboard bearing receiving bore 162 makes available a relatively large amount of lubrication to the inboard bearing where better lubrication is often needed.

Figure 8:
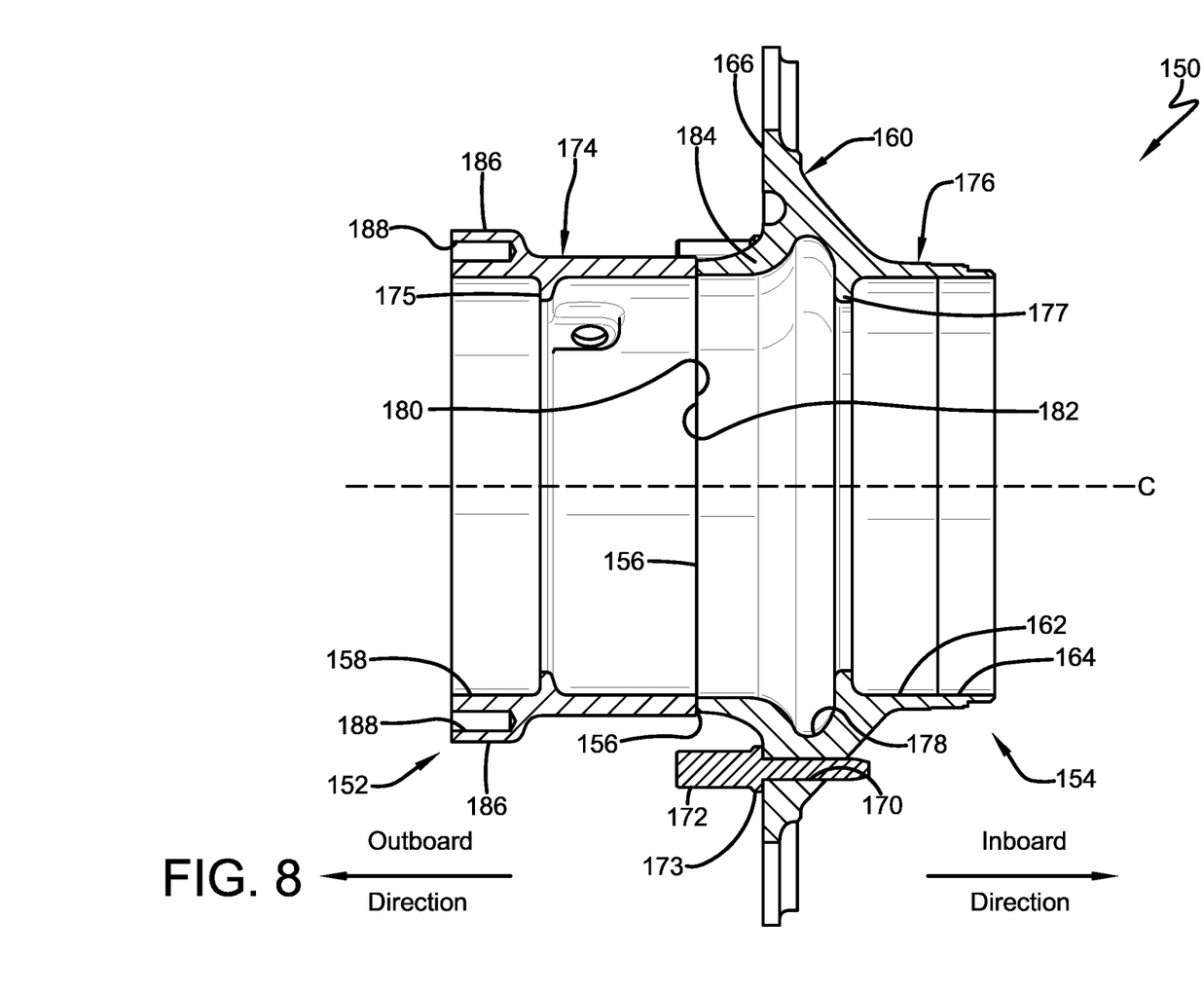
FIG. 8 is a cross-sectional view of the wheel hub shown in FIGS. 6-7, taken approximately along line 8-8 in FIG. 6.

Inboard end 180 of outboard portion 152 and outboard end 182 of inboard portion 154 may be formed as flat annular surfaces, contained in a plane substantially perpendicular to a longitudinal central axis C of wheel hub 150. Inboard and outboard ends 180, 182 may be arranged to abut one another to enable forming a butt joint for rotational friction welding or laser welding or other suitable processes. Thus, forming joint 156 may involve abutting inboard and outboard ends 180, 182 against one another and rotating them about respective rotational axes. Joint 156 is located between outboard bearing receiving bore 158 of outboard portion 152 and inboard bearing receiving bore 162 of inboard portion 154 in an area that exhibits relatively low stress in wheel hub 150. The joint 156 may be located more proximal to the reservoir channel 178 than to outboard bearing receiving bore 158.

Figure 6:
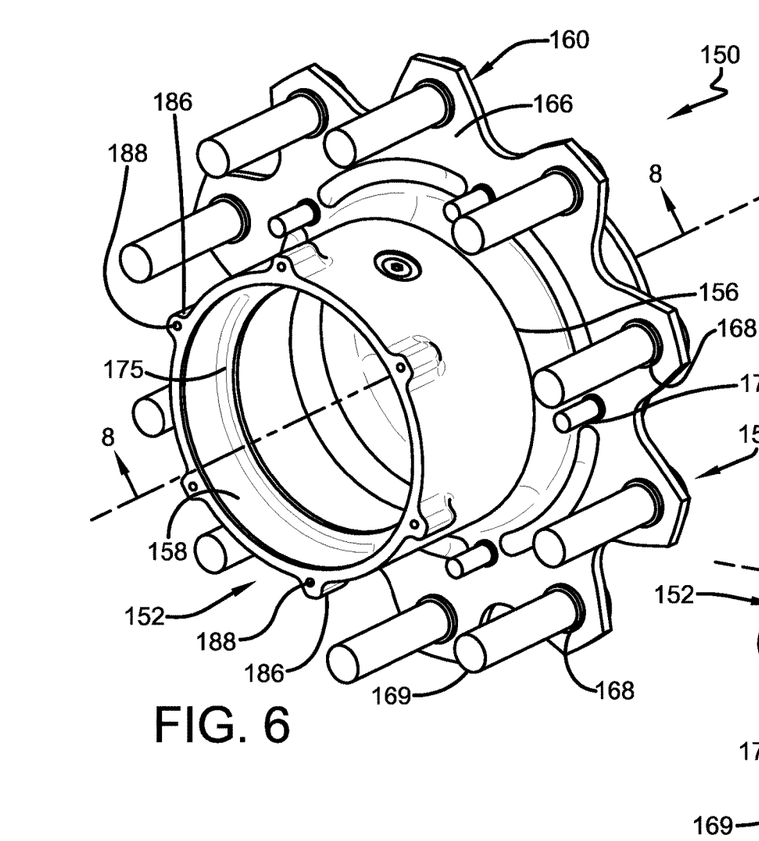
FIG. 6 is a perspective view of a wheel hub according to yet another aspect of the disclosed subject matter for a heavy-duty vehicle viewed from an outboard side.
Figure 7:
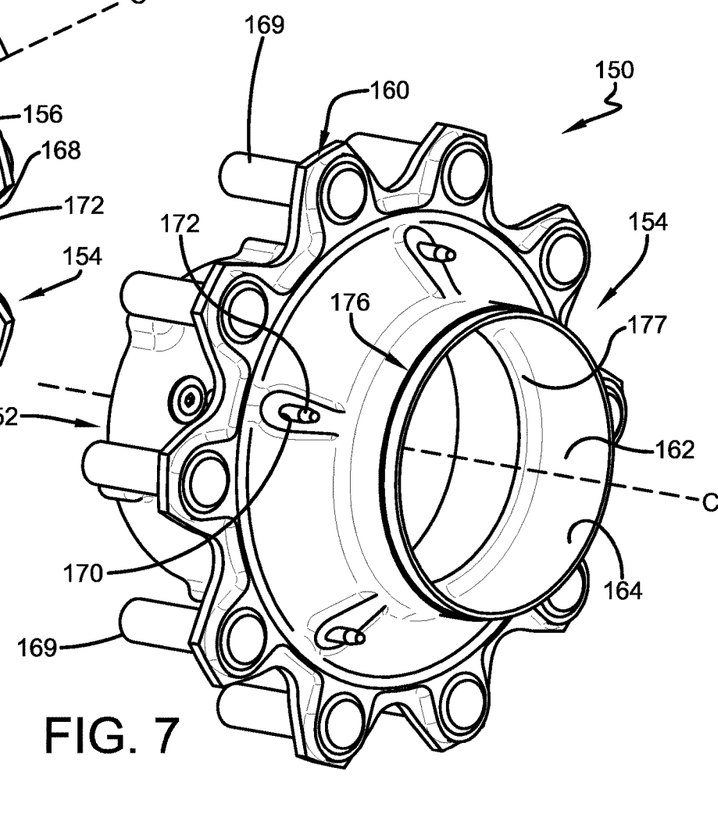
FIG. 7 is a perspective view of the wheel hub shown in FIG. 6 taken from an inboard side.

Wheel hub 150 utilizes relatively less material than prior art wheel hub 42. Specifically, outboard portion 152 and inboard portion 154 may be formed by processes other than casting, enabling the use of different materials. This enables the shape and properties of the wheel hub 150 to be optimized for particular design considerations. Outboard portion 152 and inboard portion 154 may be forged from high-strength steel, enabling barrel 174 of outboard portion 152 and a barrel 176 of inboard portion 154 to have an outer diameter substantially close to the outer diameter of an associated axle spindle bearing receiving surfaces (not shown). This allows wheel hub 150 to have a reduced diameter and wall thickness. Thus, wheel hub 150 allows for optimization of strength-to-weight ratio and reduces cost of manufacturing and materials.

Inboard portion 154 provides an improved transition with a less rapid section modulus change at transition region 184 (FIG. 8) between wheel mounting flange 160 and the barrel 176. Specifically, the outboard section of barrel 176 has a relatively smaller outer diameter and is formed radially away from pilot studs 172 allowing transition region 184 to form a gradual, sloping radius. This results in a less rapid section modulus change that reduces the stress in the region of connection 184 to improve strength and fatigue resistance of wheel hub 150.

Barrel 174 of outboard portion 152 and barrel 176 of inboard portion 154 have a relatively thin wall thickness. The reduced wall thickness allows less energy to be used to form joint 156. This provides improved strength and performance of wheel hub 150, while reducing weight, porosity, and the cost of manufacturing and materials associated with forming the wheel hub.

A wheel hub 250 (FIG. 9), according to another aspect, is similar to wheel hub 150 in structure and function and formed from two discrete pieces or components joined together. Wheel hub 250 generally includes an outboard portion 252 and an inboard portion 254 connected at a joint 256. Outboard portion 252 includes an inboard end 280, one or more bosses 286, and an outboard bearing receiving bore 258. Outboard bearing receiving bore 258 is machined to narrow tolerances and receives an outboard bearing (not shown), as is known.

Figure 9:
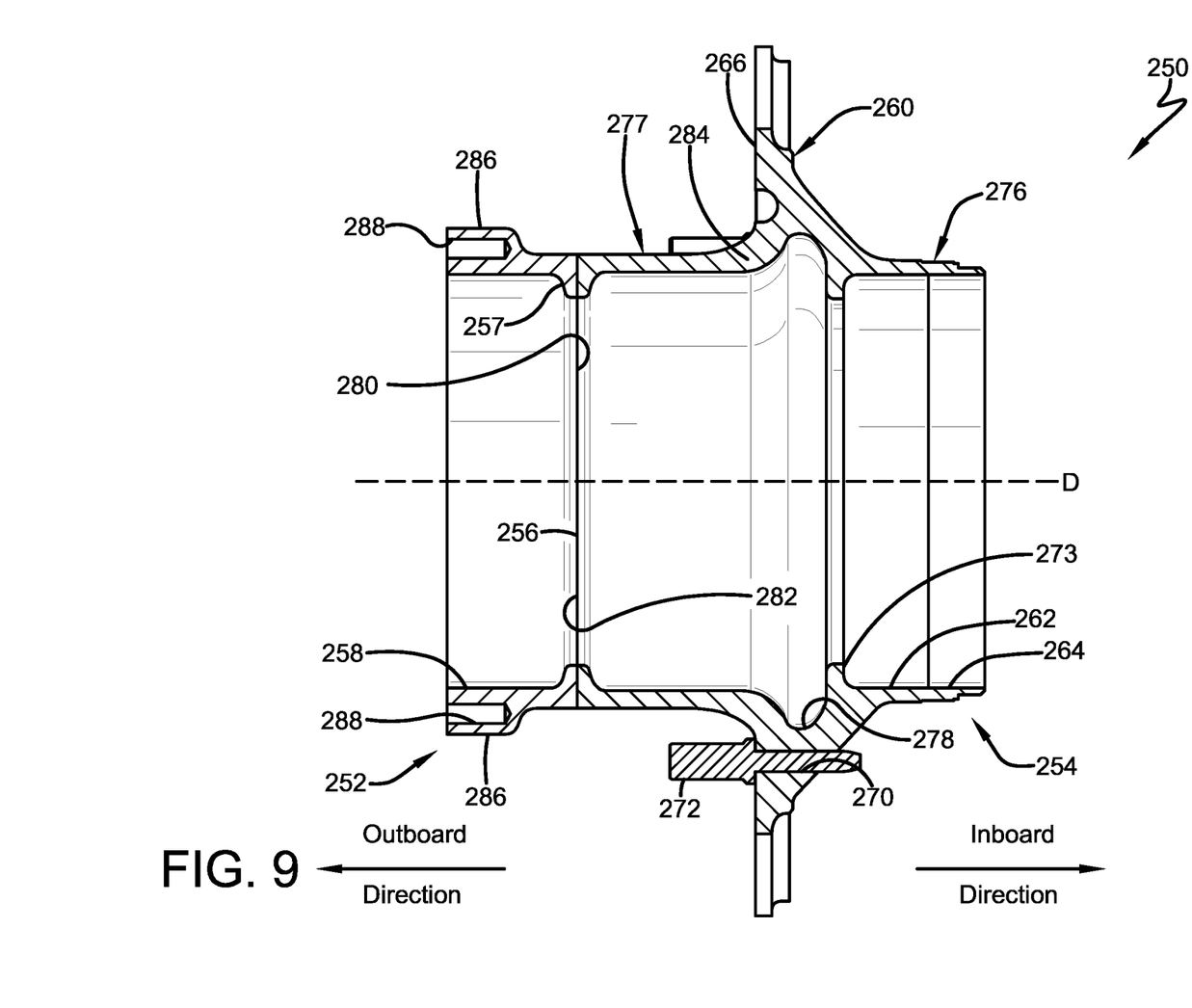
FIG. 9 is a cross-sectional view of yet another aspect of the wheel hub, which is similar in structure to the wheel hub shown in FIG. 8.

Inboard portion 254 is formed with an inboard barrel 276, an outboard barrel 277, and a radially extending wheel mounting flange 260 located between barrels 276, 277. Barrel 276 includes an inboard bearing receiving bore 262 that is machined to narrow tolerances and receives an inboard bearing (not shown). Inboard portion 254 also includes an outboard end 282, an inboard bearing cup engaging end surface 273, a main seal bore 264, a drum and wheel rim mounting surface 266, and openings (not shown) that receive mounting studs (not shown). Each of outboard end 282, main seal bore 264, drum and wheel rim mounting surface 266, and the mounting stud openings are machined to narrow tolerances. Wheel mounting flange 260 is formed with openings 270 for receiving removable pilot studs 272.

A lubricant reservoir or channel 278 is formed in the inboard portion 254. A majority of the volume of the reservoir channel 278 is located radially inward of the wheel mounting flange 260. The reservoir channel 278 may have a portion with an inner diameter that is greater than an outer diameter of barrels 276, 277. The reservoir channel 278 provides a volume for additional lubricant to occupy and further lessens the weight of the hub 250 by displacing metal material. Locating the reservoir channel 278 in the area of the inboard bearing receiving bore 262 makes available a relatively large amount of lubrication near the inboard bearing where better lubrication is often needed.

Inboard end 280 and outboard end 282 may be formed as flat annular surfaces, contained in a plane substantially perpendicular to a longitudinal central axis D of wheel hub 250. Inboard and outboard ends 280, 282 may be arranged to abut one another to enable forming a butt joint for rotational friction welding or any other suitable processes. Thus, forming joint 256 may involve abutting inboard and outboard ends 280, 282 against one another and rotating them about the longitudinal central axis D. Joint 256 is generally located between outboard bearing receiving bore 258 of outboard portion 252 and inboard bearing receiving bore 262 of inboard portion 254 in an area that experiences relatively low stress in wheel hub 250. Joint 256 may be located more proximal to the outboard bearing receiving bore 258 than to the drum and wheel rim mounting surface 266 or the reservoir channel 278. Joint 256 is machined after welding, such that displaced material, or flash curl, is removed from the outer surface of the joint. The inner surface of the joint 256 is partially machined, such that a portion of the weld flash curl may be used to form an end surface 257 of outboard bearing receiving bore 258 for engaging a bearing cup of the outboard bearing assembly. This results in a simplification of forging or forming the outboard portion 252 and inboard portion 254 and a reduction in the amount of machining required and the associated cost.

The bosses 286 include openings 288 for receiving fasteners (not shown) to attach a wheel hub cap (not shown) to wheel hub 250. The bosses 286 can be formed integrally with the outer segment optimizing the cost and amount of material used. This may also reduce the weight of wheel hub 250, the amount of time required to manufacture wheel hub 250, and cost associated with waste material lost to machining. Other hub cap attachment arrangements may be employed without detracting from the disclosed subject matter. Thus, wheel hub 250 provides relatively good strength and performance and reduced weight, porosity, and cost of manufacturing and materials associated with forming the wheel hub.

A wheel hub 350 (FIG. 10), according to another aspect, is similar in construction and arrangement to wheel hub 150 and formed from three discrete pieces or components joined together. Wheel hub 350 includes an outboard portion 352 and an intermediate portion 353 connected together at joint 355. The intermediate portion 353 and an inboard portion 354 are connected together at joint 356. Outboard and intermediate portions 352, 353 are generally barrel-shaped. Intermediate portion 353 includes an inboard end 380 and an outboard end 381. Outboard portion 352 includes an inboard end 383, one or more bosses 386, an outboard bearing cup engaging end surface 357, and an outboard bearing receiving surface 358. Outboard bearing receiving bore 358 is machined to narrow tolerances and receives an outboard bearing (not shown). Bosses 386 include openings 388 for receiving fasteners (not shown) to attach a wheel hub cap (not shown).

Figure 10:
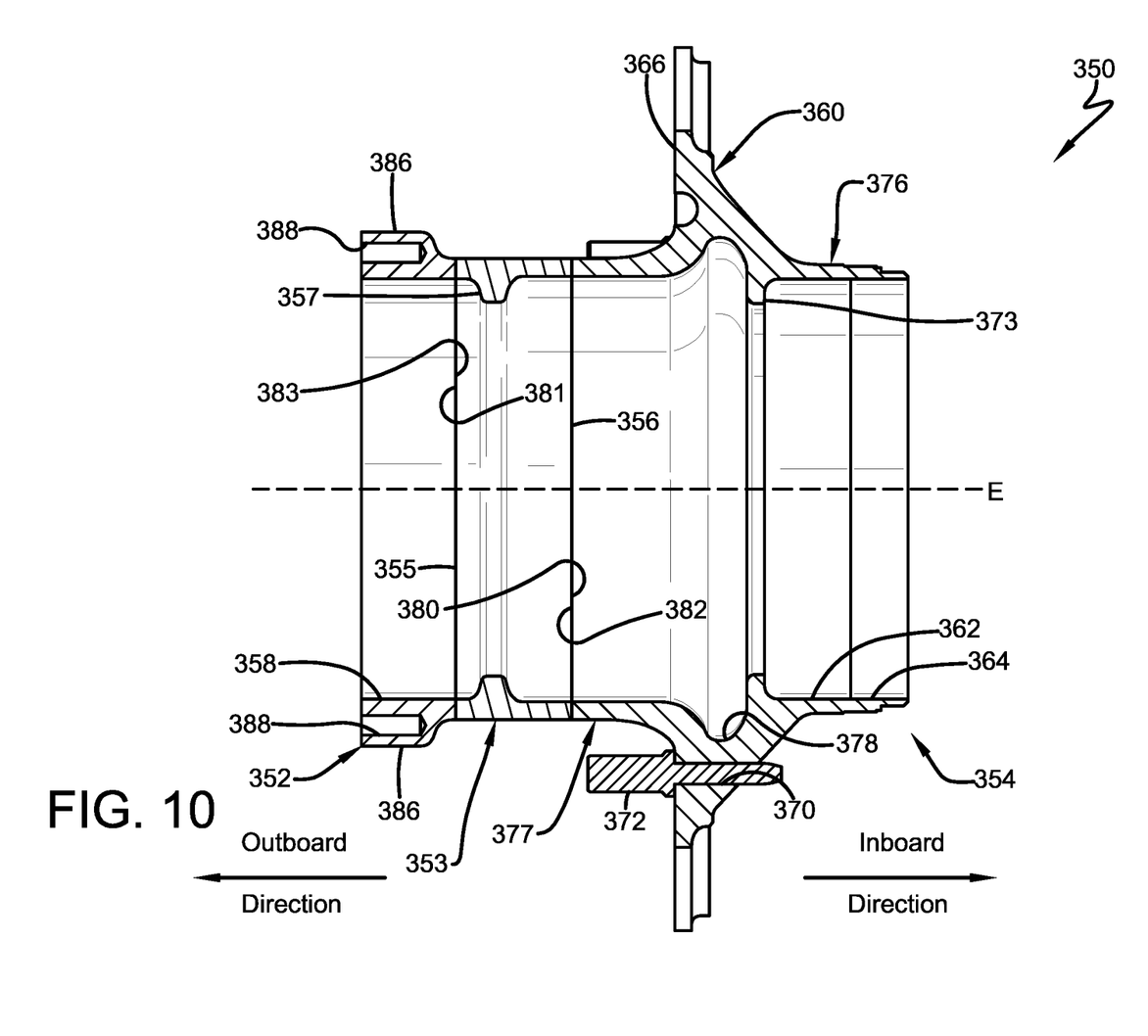
FIG. 10 is a cross-sectional view of a three-piece wheel hub for a heavy-duty vehicle of the disclosed subject matter.

Outboard and intermediate portions 352, 353 preferably may be formed by forging and joined at joint 355 by friction or laser welding. This allows excess metal material to be machined away from the inner and outer surfaces of the joint 355, reducing the weight of the wheel hub 350. Bosses 386 may be formed integrally with the outboard portion 352 during forging. This may result in reduced weight and lower manufacturing and material costs associated with forming the wheel hub 350.

Inboard portion 354 is formed with an inboard barrel 376 and an outboard barrel 377 on axially opposite sides of a radially extending wheel mounting flange 360. Inboard portion 354 also includes an inboard bearing cup engaging end surface 373 and an inboard bearing receiving bore 362. Inboard bearing receiving bore 362 is machined to a narrow tolerance and receives an inboard bearing (not shown). Inboard portion 354 also includes an outboard end 382, a main seal bore 364, a drum and wheel rim mounting surface 366, and openings (not shown) that receive mounting studs (not shown). Each of outboard end 382, main seal bore 364, drum and wheel rim mounting surface 366, and the mounting stud openings are machined to narrow tolerances. Wheel mounting flange 360 is formed with openings 370 for receiving removable pilot studs 372.

A reservoir or channel 378 is formed in the inboard portion 354. A majority of the volume of the reservoir channel 378 is located radially inward of the wheel mounting flange 360. The reservoir channel 378 may have a portion with an inner diameter that is greater than an outer diameter of the barrel 376. The reservoir channel 378 provides a volume for additional lubricant to occupy and further lessens the weight of the hub 350 by displacing metal material. Locating the reservoir channel 378 in the area of the inboard bearing receiving bore 362 makes available a relatively large amount of lubrication near the inboard bearing where better lubrication is often needed.

Inboard ends 380, 383 and outboard ends 381, 382 may be formed as flat annular surfaces, contained in a plane substantially perpendicular to a longitudinal central axis E of wheel hub 350. Inboard end 383 and outboard end 381 of the intermediate portion 353 may be arranged to abut one another to connect at joint 355 by suitable processes, such as friction or laser welding, as is known. Joint 355 is located in the region of the outboard bearing receiving bore 358. Inboard end 380 of the intermediate portion 353 and outboard end 382 may be arranged to abut one another to connect at joint 356 by suitable processes, such as friction or laser welding, as is known. Joints 355, 356 are generally located between outboard bearing receiving bore 358 and inboard bearing receiving bore 362 in areas that exhibit relatively low stress in wheel hub 350. Each of the outboard, intermediate, and inboard portions 352, 353, 354, respectively, may be joined in any suitable sequence. As a result, wheel hub 350 provides relatively good strength, relatively good performance, reduced weight, minimal if any porosity, and relatively low cost of manufacturing and materials.

The above-described construction of wheel hub 100, 130, 150, 250, 350 of the disclosed subject matter provides a wheel hub that is lighter in weight, more economical to manufacture, and exhibits improved physical properties when compared to prior art one-piece wheel hub 42.

Specifically, forming wheel hub 100, 130, 150, 250, 350 from two or more discrete portions 102, 104, 132, 134, 152, 154, 252, 254, 352, 353, 354, respectively, and then joining the portions together, enables each portion to be cast or forged as a smaller unit or formed from other processes. By employing smaller castings, wheel hubs 100, 130, 150, 250, 350 have reduced potential for porosity issues. Casting or forging of smaller, less complex shapes enables better control over critical surfaces, more efficient machining, and reduced weight of wheel hub 100, 130, 150, 250, 350 when compared to prior art wheel hub 42. Casting or forging wheel hub 100, 130, 150, 250, 350 from two or more discrete portions optimizes the amount of raw material employed to form the wheel hub and reduces the amount of scrap compared to prior art wheel hub 42. This decreases the cost of forming the wheel hub 100, 130, 150, 250, 350.

Formation of portions wheel hub 102, 104, 132, 134, 152, 154, 252, 254, 352, 353, 354 from processes other than casting, such as forging, increases the available selection of materials. This allows for individualized optimization of wheel hub portions 102, 104, 132, 134, 152, 154, 252, 254, 352, 353, 354 for specific properties. This enables wheel hub 100, 130, 150, 250, 350 to be lighter in weight, to include improved strength-to-weight ratios, and to exhibit additional desirable physical properties or attributes while reducing the cost of materials and manufacturing.

It is to be understood that the structure and function of the disclosed subject matter may be altered or rearranged, or certain components omitted or added, without affecting the overall concept or operation. It is to be understood that materials and manufacturing processes other than those described above may be employed for the disclosed subject matter wheel hub without affecting the overall concept or operation. It is also to be understood that the disclosed subject matter finds application in all types of wheel hubs and wheel end assemblies, including other types of wheel hubs and wheel end assemblies than those shown and described without affecting the concept or operation. While wheel hubs 100, 130, 150, 250, 350 are described and illustrated for use with drum brakes, the concepts may apply to other types of braking systems, for example air disc brakes with rotors.

When introducing elements or features of the present disclosure and the exemplary aspects, the articles "a", "an" and "the" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Although the description has been shown and described with respect to one or more aspects, applications, or implementations, it will occur to those skilled in the art, based upon a reading and understanding of this description and the drawings, that equivalent alterations and modifications may be made without detracting from the spirit and scope of the, aspects or implementations in the description and drawings. The description, drawings, and claims are intended to include all such modifications and alterations.

Having now described the features, discoveries and principles of the disclosed subject matter, the manner in which the wheel hub for heavy-duty vehicles is used, the properties of the construction, arrangement and method steps, and the advantageous, new and useful results obtained, the new and useful structures, devices, elements, arrangements, process, parts and combinations are set forth in the appended claims.

What is claimed is:

1. A wheel hub for a heavy-duty vehicle comprising:
   a first tubular hub segment having an annular first end surface;
   a second tubular hub segment having an annular second end surface and a radially-outward extending flange; and
   a continuous circumferential joint formed at an interface of the annular first end surface and annular second end surface, said joint being located outboard of said radially-outward extending flange.

2. The wheel hub for a heavy-duty vehicle of claim 1 further including one or more of the first tubular hub segment and second tubular hub segment being formed by at least one process chosen from the group consisting of forging, casting, and swaging.

3. The wheel hub for a heavy-duty vehicle of claim 2, wherein each of the first and second tubular hub segments being formed by a different process.

4. The wheel hub for a heavy-duty vehicle of claim 1 wherein the continuous circumferential joint is formed by at least one process selected from the group consisting of friction welding and induction butt welding.

5. The wheel hub for a heavy-duty vehicle of claim 1 further including the first tubular hub segment having a first bearing receiving bore and the second tubular hub segment having a second bearing receiving bore, the continuous circumferential joint located between the first bearing receiving surface and the second bearing receiving surface.

6. The wheel hub for a heavy-duty vehicle of claim 1 wherein the flange of the second tubular hub segment includes a wheel mounting surface and a plurality of pilot openings in the flange.

7. The wheel hub for a heavy-duty vehicle of claim 6 further including a plurality of removable pilot studs, each of the plurality of removable pilots studs being receivable in a respective one of the plurality of pilot openings.

8. The wheel hub for a heavy-duty vehicle of claim 6 further including a plurality of openings on the wheel mounting flange, each of the plurality of openings receiving a respective wheel mounting stud.

9. A wheel hub for a heavy-duty vehicle comprising:
   a first tubular hub segment having an annular first end surface;
   a second tubular hub segment having an annular second end surface and a radially-outward extending flange, said flange including a wheel mounting surface, a plurality of pilot openings, and a plurality of openings receiving a respective wheel mounting stud; and
   a continuous circumferential joint formed at an interface of the annular first end surface and annular second end surface.

10. A wheel hub for a heavy-duty vehicle comprising:
    a first tubular hub segment having a planar annular first end surface;

a second tubular hub segment having a planar annular second end surface and a radially-outward extending flange, said planar annular second end surface abutting said planar annular first end surface to form an interface; and a continuous circumferential joint formed at the interface of the planar annular first end surface and the planar annular second end surface.

11. The wheel hub for a heavy-duty vehicle of claim 10 further including one or more of the first tubular hub segment and second tubular hub segment being formed by at least one process chosen from the group consisting of forging, casting, and swaging.

12. The wheel hub for a heavy-duty vehicle of claim 11, wherein each of the first and second tubular hub segments being formed by a different process.

13. The wheel hub for a heavy-duty vehicle of claim 10 wherein the continuous circumferential joint is formed by at least one process selected from the group consisting of friction welding and induction butt welding.

14. The wheel hub for a heavy-duty vehicle of claim 10 further including the first tubular hub segment having a first bearing receiving bore and the second tubular hub segment having a second bearing receiving bore, the continuous circumferential joint located between the first bearing receiving surface and the second bearing receiving surface.

15. The wheel hub for a heavy-duty vehicle of claim 10 wherein the flange of the second tubular hub segment includes a wheel mounting surface and a plurality of pilot openings in the flange.

16. The wheel hub for a heavy-duty vehicle of claim 15 further including a plurality of removable pilot studs, each of the plurality of removable pilots studs being receivable in a respective one of the plurality of pilot openings.

17. The wheel hub for a heavy-duty vehicle of claim 15 further including a plurality of openings on the wheel mounting flange, each of the plurality of openings receiving a respective wheel mounting stud.

18. The wheel hub for a heavy-duty vehicle of claim 10 wherein at least one of the first tubular hub segment and the second tubular hub segment is forged.

19. The wheel hub for a heavy-duty vehicle of claim 18 wherein the other one of the at least one of the first tubular hub segment and the second tubular hub segment is cast.

20. The wheel hub for a heavy-duty vehicle of claim 1 wherein at least one of the first tubular hub segment and the second tubular hub segment is forged.

21. The wheel hub for a heavy-duty vehicle of claim 20 wherein the other one of the at least one of the first tubular hub segment and the second tubular hub segment is cast.

* * * * *